United States Patent
Neugebauer et al.

(10) Patent No.: US 12,049,920 B2
(45) Date of Patent: Jul. 30, 2024

(54) ROLLER BEARING ASSEMBLY FOR DETERMINING LOADS

(71) Applicant: Schaeffler Technologies AG & Co. KG, Herzogenaurach (DE)

(72) Inventors: Benedikt Neugebauer, Üchtelhausen (DE); Jens Heim, Bergrheinfeld (DE); Marco Hornung, Viereth-Trunstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 213 days.

(21) Appl. No.: 17/619,878

(22) PCT Filed: May 18, 2020

(86) PCT No.: PCT/DE2020/100431
§ 371 (c)(1),
(2) Date: Dec. 16, 2021

(87) PCT Pub. No.: WO2020/259741
PCT Pub. Date: Dec. 30, 2020

(65) Prior Publication Data
US 2022/0356901 A1    Nov. 10, 2022

(30) Foreign Application Priority Data
Jun. 25, 2019 (DE) .......................... 102019116999.2

(51) Int. Cl.
*F16C 19/52* (2006.01)
*F16C 33/58* (2006.01)
*G01L 5/00* (2006.01)

(52) U.S. Cl.
CPC .......... *F16C 19/522* (2013.01); *F16C 33/586* (2013.01); *G01L 5/0009* (2013.01); *F16C 2233/00* (2013.01); *F16C 2360/31* (2013.01)

(58) Field of Classification Search
CPC .... F16C 19/386; F16C 19/522; F16C 33/586; F16C 41/00; F16C 2233/00;
(Continued)

(56) References Cited

U.S. PATENT DOCUMENTS 4,203,319 A * 5/1980 Lechler ................. G01L 5/0019
73/862.541
4,341,122 A * 7/1982 Lechler ................. G01L 5/1627
73/862.045
(Continued)

FOREIGN PATENT DOCUMENTS

CN 1230245 A 9/1999
CN 1488072 A 4/2004
(Continued)

OTHER PUBLICATIONS

Machine Translation of JP-2007024294-A (Year: 2007).*

*Primary Examiner* — Alan B Waits
(74) *Attorney, Agent, or Firm* — Volpe Koenig

(57) ABSTRACT

A roller bearing assembly for determining loads on a roller bearing includes a roller bearing having coaxial inner and outer rings and an axis of rotation, and a plurality of rollers each having a rotation axis being arranged between the rings. At least one ring has recess for receiving a force-measuring pin. A force-measuring pin is received in the recess. The longitudinal axis of the force-measuring pin extends at least partly along the axis of rotation of the roller bearing. The recess and the force-measuring pin extends into a region, which is under a load, of the ring that has the recess such that at least one vertical projection plane perpendicular to the rotation axis of the rollers extends along the force-measuring pin and a region of maximum load. This allows loads to be reliably measured.

16 Claims, 1 Drawing Sheet

(58) Field of Classification Search
CPC .... F16C 2360/31; F03D 80/70; G01M 13/04; G01L 5/0009–0023
See application file for complete search history.

(56) References Cited

U.S. PATENT DOCUMENTS

| | | | | |
|---|---|---|---|---|
| 5,952,587 | A | * | 9/1999 | Rhodes ................. G01L 5/0019 73/862.541 |
| 2007/0143039 | A1 | * | 6/2007 | Mol ..................... F16C 19/522 702/41 |
| 2012/0078537 | A1 | * | 3/2012 | Ince ................... G01M 13/022 702/42 |
| 2015/0260229 | A1 | | 9/2015 | Thierry et al. |
| 2017/0016786 | A1 | * | 1/2017 | Heim ................... F16C 33/586 |

FOREIGN PATENT DOCUMENTS

| | | | | |
|---|---|---|---|---|
| CN | 102597728 | A | | 7/2012 |
| CN | 105122025 | A | | 12/2015 |
| CN | 106461479 | A | | 2/2017 |
| CN | 108071669 | A | | 5/2018 |
| DE | 9422237 | U1 | | 5/1999 |
| DE | 10017572 | A1 | | 10/2001 |
| DE | 102008016592 | | | 10/2009 |
| DE | 102014204025 | | | 9/2015 |
| DE | 102017111743 | B3 | | 5/2018 |
| DE | 102017111745 | | | 12/2018 |
| DE | 102017112342 | A1 | | 12/2018 |
| EP | 0637734 | | | 2/1995 |
| FR | 2125926 | A5 | | 9/1972 |
| FR | 2736979 | A1 | | 1/1997 |
| GB | 1378685 | A | | 12/1974 |
| GB | 201516660 | | | 11/2015 |
| GB | 2542422 | A | | 3/2017 |
| JP | 2007024294 | A | * | 2/2007 ............ F16C 19/386 |
| JP | 2013250204 | A | | 12/2013 |
| WO | 2006057269 | A1 | | 6/2006 |
| WO | WO-2009092390 | A1 | * | 7/2009 ............ F16C 19/522 |
| WO | 2014090332 | A1 | | 6/2014 |
| WO | 2018219379 | | | 12/2018 |

* cited by examiner

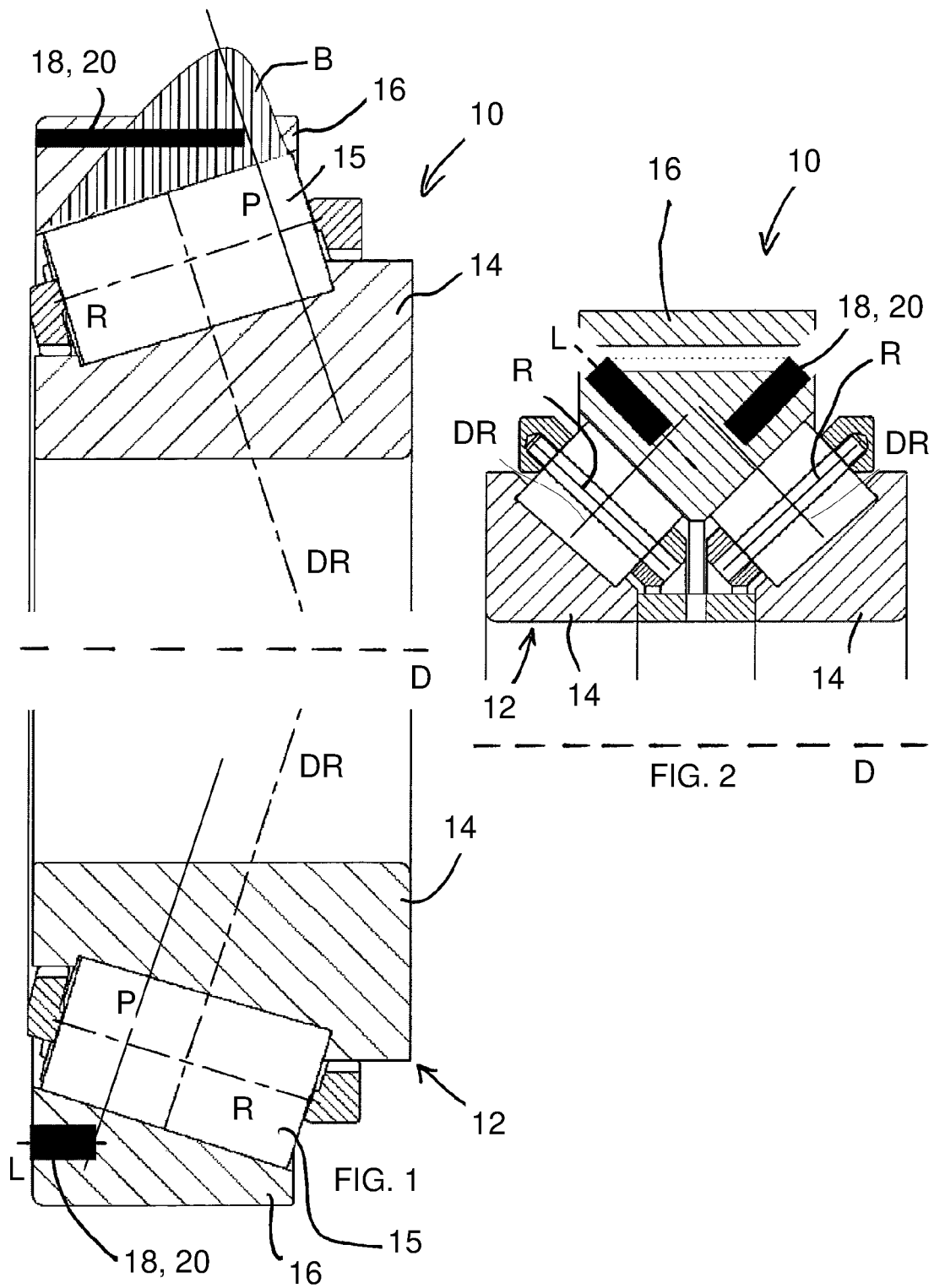

ROLLER BEARING ASSEMBLY FOR DETERMINING LOADS

CROSS-REFERENCE TO RELATED APPLICATIONS

This application is the U.S. National Phase of PCT Appln. No. PCT/DE2020/100431, filed May 18, 2020, which claims priority from German Patent Application No. 10 2019 116 999.2, filed Jun. 25, 2019, the entire disclosures of which are incorporated by reference herein.

TECHNICAL FIELD

The disclosure relates to a roller bearing assembly for determining loads.

BACKGROUND

In general, the loads to which a roller bearing assembly of a wind energy installation, for example, is exposed in the course of its operation are not recorded. The load history of wind turbines is therefore mostly unknown. Load measurements are often only carried out on prototype systems as part of certification. However, a transfer of the design and prototype loads to series systems is not possible without some effort, since location-dependent influences are not known/transferable. These can be, for example, effects with reference to the wind field, wind farm effects or operating strategy depending on the network quality.

For general roller bearings, there are already approaches for a permanent determination of the load. For example, the specification DE 10 2014 204 025 A1 discloses a component with a measuring element having at least one sensor. The component is designed as a roller bearing, for example. Specifically, the solution of this specification provides a component with a material recess and a measuring element having at least one sensor, which is fitted into the material recess in a force-fitting manner, the sensor being arranged on the measuring element in such a way that the measuring direction of the sensor essentially coincides with the line of action of the contact angle.

A contact angle is the angle between the radial plane and the contact line, the position of the contact line being heavily dependent on the rolling elements and roller tracks used.

However, it has been found for use on roller bearings that the maximum pressure distribution is often not in the center of the raceway for structural reasons, which corresponds to the line of action of the contact angle. The teaching of the specification cannot therefore be reliably applied to roller bearings.

SUMMARY

It is therefore the object of the disclosure to create a roller bearing assembly having improved load measurement.

The object is achieved by a roller bearing assembly and a roller bearing with one or more of the features disclosed herein. Preferred embodiments are specified below and in the claims, each of which can be used either individually or in combination represent an aspect of the disclosure.

The disclosure thus relates to a roller bearing assembly for determining loads on a roller bearing, having a roller bearing with two coaxial rings, specifically an inner ring and an outer ring, and an axis of rotation, a plurality of rollers each having a rotation axis being arranged between the inner ring and the outer ring, and at least one of the rings having at least one recess for receiving a force-measuring pin, at least one force-measuring pin, which is received in the recess, the longitudinal axis of the force-measuring pin arranged in the recess extending at least partly along the axis of rotation of the roller bearing, the at least one recess and the at least one force-measuring pin extending along the longitudinal axis into a region, which is under a load, of the ring that has the at least one recess in such a way that at least one vertical projection plane perpendicular to the rotation axis of the rollers extends along the force-measuring pin and a region of maximum load.

The basic idea of the disclosure is thus that the at least one recess and the at least one force-measuring pin are arranged along the longitudinal axis in such a way that they form a projection vertical plane through the region of maximum load. The position of the contact angle is therefore not essential, since this does not always run through the range of maximum load in the case of roller bearings. Instead, depending on the case, the region of maximum load is identified individually and the at least one recess and the at least one force-measuring pin are arranged accordingly. This enables reliable detection of the loads acting on the roller bearing.

After all, the projection vertical plane is independent of the line of action of the contact angle.

A roller bearing is preferably able to withstand very high loads both in the radial and in the axial direction. It is usually installed in pairs: For example, two tapered roller bearings are set against each other because tapered roller bearings consist of two loose elements: the inner ring with tapered rollers as rolling elements, and the outer ring as the bearing shell. The tapered rollers on the inner ring have the shape of a truncated cone, and they are also slightly inclined towards the axis of rotation. The play is adjustable. The cone tips and any generatrices of the cone shells, of the inner ring, outer ring and all rollers meet at one point on the axis of rotation, because then the rollers can roll off without slippage.

Within the meaning of the disclosure, in addition to the tapered roller bearings mentioned by way of example, roller bearings are also understood to mean spherical roller bearings, cylindrical roller bearings and similarly acting bearings.

According to a preferred embodiment, it is provided that the roller bearing has a plurality of force-measuring pins arranged in recesses on at least one ring, preferably both rings, preferably at least two force-measuring pins arranged in the recesses being designed to be of different lengths along their longitudinal axis, preferably at least two force-measuring pins arranged in the recesses being distributed circumferentially on a respective ring. The more force-measuring pins there are, the more accurate measurements can be made. The different lengths make it possible to intervene differently in the load regions with detection. For this purpose, a circumferentially uniform distribution is particularly preferred.

The at least one recess, preferably a plurality of recesses, for receiving a force-measuring pin in each case can in particular be arranged on one end face or both end faces of the inner ring and/or the outer ring. However, it is also possible that the at least one recess, preferably a plurality of recesses, is arranged for receiving a force-measuring pin on the outer face of the inner ring and/or the outer ring.

According to a preferred embodiment, it is provided that the at least one recess for receiving a force-measuring pin is arranged in a ring fixed to the environment. This enables easy means of measurement. In particular, cables can be used, whereas a telemetry connection would be required in the case of a ring that can be rotated relative to the surroundings. A ring that is fixed to the environment is the ring of a roller bearing that is fixed to its environment. It corresponds to the principle of a roller bearing that one ring rotatably supports a body of revolution and the other ring is a ring that is fixed to the environment.

According to a preferred embodiment, it is provided that at least four force-measuring pins are arranged and designed on at least one ring in such a way that two force-measuring pins are arranged opposite one another along a respective diagonal axis on the at least one ring, the two diagonal axes preferably running in such a way that one diagonal axis is a horizontal axis and/or the other diagonal axis is a vertical axis. This enables a good distribution of the force-measuring pins and thus good measurement results. The arrangement that one diagonal axis is a horizontal axis and/or the other diagonal axis is a vertical axis can be interpreted with horizontal as extending over the horizon and with vertical as pointing to the center of the earth. In other words, this arrangement corresponds to the times 12, 3, 6 and 9 on a clock.

According to a preferred embodiment, it is provided that the at least two force-measuring pins along the diagonal axis formed as a horizontal axis along their longitudinal axis have the same length and/or in that the at least two force-measuring pins along the diagonal axis formed as a vertical axis along their longitudinal axis have the same length. It has been found that this enables good measurement results. Any measurement errors can also be detected and taken into account.

According to a preferred embodiment, it is provided that the length of the at least one force-measuring pin along its longitudinal axis depends on the mechanical properties of the ring, the length of the at least one force-measuring pin along its longitudinal axis in the case of a ring being formed longer with high rigidity than in the case of a ring with low rigidity. It has been found that this enables good measurement results.

According to a preferred embodiment, it is provided that the longitudinal axis of at least one force-measuring pin, preferably a plurality of force-measuring pins, is angled, in particular 45 degrees, to the axis of rotation of the roller bearing. It has been found that this enables good measurement results.

According to a preferred embodiment, it is provided that the longitudinal axis of at least one force-measuring pin, preferably a plurality of force-measuring pins, is angled to the axis of rotation of the roller bearing such that the longitudinal axis of at least one force-measuring pin, preferably a plurality of force-measuring pins, is arranged parallel to the rotation axis of the rollers. It has been found that this makes sense at large contact angles, for example 45 degrees, and enables good measurement results.

According to a preferred embodiment, it is provided that the longitudinal axis of at least one force-measuring pin, preferably a plurality of force-measuring pins, is arranged parallel to the axis of rotation of the roller bearing. It has been found that recesses can be worked well into the respective ring parallel to the axis of rotation of the roller bearing and that force-measuring pins can be easily inserted into corresponding bores. Furthermore, there is no risk of falling out in the event of an unfavorable positioning of the recess due to the weight of the force-measuring pin.

The disclosure further relates to a roller bearing for an aforementioned roller bearing assembly, characterized by the features of the roller bearing, in particular the at least one recess according to the foregoing.

According to a preferred embodiment, it is provided that the force-measuring pin is aligned and arranged with respect to the axis of rotation as a function of a position of a maximum of a pressure distribution between the inner ring and the outer ring and as a function of a circumferential position of the force-measuring pin.

According to a preferred embodiment, it is provided that at least four force-measuring pins are distributed over a circumference on at least one ring and are spaced apart over the circumference.

According to a preferred embodiment, it is provided that four force-measuring pins are arranged spaced apart over an arc angle of 90 degrees on the circumference of a ring. According to a particularly preferred embodiment in this regard, it is provided that two of the four force-measuring pins are arranged on a straight line running horizontally at the end of the roller bearing and two of the four force-measuring pins are arranged on a straight line running vertically at the end of the roller bearing.

According to a preferred embodiment, it is provided that at least two force-measuring pins are arranged circumferentially distributed on one of the rings, the force-measuring pins having different lengths, the at least two force-measuring pins preferably being arranged at different depths within the respective recess.

According to a preferred embodiment, it is provided that at least two force-measuring pins are arranged circumferentially distributed on one of the rings, two force-measuring pins spaced apart from one another over an arc angle of 180 degrees being of equal length, preferably four force-measuring pins being circumferentially distributed over an arc angle of 90 degrees and spaced apart on one of the rings, and all four force-measuring pins being designed to be of the same length.

According to a preferred embodiment, it is provided that the at least one force-measuring pin extends with its longitudinal axis parallel to a raceway of the inner ring and/or the outer ring, the roller bearing preferably having a contact angle between a radial plane and a contact line of 30 degrees to 90 degrees, particularly preferably of 45 degrees to 90 degrees.

According to a preferred embodiment, it is provided that the at least one force-measuring pin is arranged as close as possible to the raceway, taking into account the load on the running surface, the at least one force-measuring pin preferably being designed to be shorter, the closer it is arranged to the running surface.

According to a preferred embodiment, it is provided that the at least one force-measuring pin is made longer, the stiffer a material surrounding the recess is made, and is made shorter, the softer the material surrounding the recess is made.

According to a preferred embodiment, it is provided that the at least one force-measuring pin is designed according to the functional principle of a strain gauge, the at least one force-measuring pin preferably being arranged on a ring of the roller bearing facing the environment.

According to a preferred embodiment, it is provided that the at least one force-measuring pin is arranged in a movable ring of the roller bearing. The roller bearing assembly preferably has a device for connection-free data transmission. In particular, this is a telemetry connection.

BRIEF DESCRIPTION OF THE DRAWINGS

In the following, the disclosure is explained by way of example with reference to the accompanying drawings using preferred exemplary embodiments, in which the features shown below can represent an aspect of the disclosure both individually and in combination. In the figures:

FIG. 1: shows a roller bearing assembly having a single-row roller bearing and having two force-measuring pins of different lengths according to a first embodiment, and FIG. 2: shows a roller bearing assembly having a two-row roller bearing and having two force-measuring pins arranged parallel to the respective rotation axis of the rollers according to a second embodiment.

DETAILED DESCRIPTION

FIGS. 1 and 2 each show a roller bearing assembly 10 for determining loads B on a roller bearing 12. The specifically illustrated roller bearing assembly 10 is, for example, a tapered roller bearing assembly. The specifically illustrated roller bearing 12 is, for example, a tapered roller bearing. Spherical roller bearing assemblies with spherical roller bearings, cylindrical roller bearing assemblies with cylindrical roller bearings and similarly acting bearing assemblies with similarly acting bearings are also possible.

For this purpose, the roller bearing assembly 10 has a roller bearing 12, which has two coaxial rings 14, 16, specifically an inner ring 14 and an outer ring 16, and an axis of rotation D, a plurality of rollers 15 each having a rotation axis R being arranged between the inner ring 14 and the outer ring 16, and at least one of the rings 14, 16 having at least one recess 18 for receiving a force-measuring pin 20, The roller bearing assembly 10 also has at least one force-measuring pin 20, which is received in the recess 18, the longitudinal axis L of the force-measuring pin 20 arranged in the recess 18 extending at least partly along the axis of rotation D of the roller bearing 12.

Thus, the at least one recess 18 and the at least one force-measuring pin 20 extend along the longitudinal axis L into a region, which is under a load B, of the ring 14, 16 that has the at least one recess 18 in such a way that at least one vertical projection plane P perpendicular to the rotation axis R of the rollers 15 extends along the force-measuring pin 20 and a region of maximum load B.

A schematic representation of the projection vertical plane P is shown in FIG. 1. In contrast, FIGS. 1 and 2 always show an axis DR of the contact angle of the rollers 15. As shown in FIG. 1, the axis DR of the contact angle of the rollers 15 does not coincide with the maximum range of the load B. This is only given by the projection vertical plane P which is perpendicular to the rotation axis R of the rollers 15. It can be sufficient if the force-measuring pin 20 rests with one end on the projection vertical plane P.

According to FIG. 1, it is shown by way of example that the roller bearing 12 has a multiplicity of force-measuring pins 20 arranged in recesses 18 on an outer ring 16. In this case, for example, at least two force-measuring pins 20 arranged in the recesses 18 are designed to be of different lengths along their longitudinal axis L.

FIGS. 1 and 2 disclose the following by way of example.

According to FIG. 1, it is shown by way of example that at least two force-measuring pins 20 arranged in the recesses 18 are arranged distributed circumferentially on the outer ring 16.

In particular, it is provided that the at least one recess 18 for receiving a force-measuring pin 20 is arranged in a ring 14, 16 fixed to the environment.

Furthermore, it is provided in particular that at least four force-measuring pins 20 are circumferentially arranged and designed on at least one ring 14, 16 in such a way that two force-measuring pins 20 are arranged opposite one another along a respective diagonal axis on the at least one ring 14, 16.

The two diagonal axes run in such a way that one diagonal axis is a horizontal axis and/or the other diagonal axis is a vertical axis.

According to FIG. 1, it is shown by way of example that at least two force-measuring pins 20 are arranged and designed circumferentially on the outer ring 16 in such a way that two force-measuring pins 20 are arranged opposite one another along a respective diagonal axis on the outer ring 16. The at least one diagonal axis runs in such a way that it is a vertical axis.

In particular, it is provided that the at least two force-measuring pins 20 along the diagonal axis formed as a horizontal axis along their longitudinal axis L have the same length and/or in that the at least two force-measuring pins 20 along the diagonal axis formed as a vertical axis along their longitudinal axis L have the same length.

Furthermore, it is provided in particular that the length of the at least one force-measuring pin 20 along its longitudinal axis L depends on the mechanical properties of the ring 14, 16, the length of the at least one force-measuring pin 20 along its longitudinal axis L in the case of a ring 14, 16 being formed longer with high rigidity than in the case of a ring 14, 16 with low rigidity.

According to FIG. 2, it is shown by way of example that the longitudinal axis L of at least one force-measuring pin 20, preferably a plurality of force-measuring pins 20, is angled, in particular 45 degrees, to the axis of rotation D of the roller bearing 12.

According to FIG. 2, it is also shown by way of example that the longitudinal axes L of at least two force-measuring pins 20 are arranged at an angle to the axis of rotation D of the roller bearing 12 such that the longitudinal axes L of the at least two force-measuring pins 20 are arranged parallel to the rotation axis R of the rollers 15.

According to FIG. 1, it is shown by way of example that the longitudinal axes L of at least two force-measuring pins 20 are arranged parallel to the axis of rotation D of the roller bearing 12.

LIST OF REFERENCE SYMBOLS

10 Roller bearing assembly
12 Roller bearing
14 Inner ring
15 Roller
16 Outer ring
18 Recess
20 Force-measuring pin
D Axis of rotation of the roller bearing
R Rotation axis of the roller
L Longitudinal axis of the force-measuring pin
B Region of the ring which is under load having the at least one recess
DR Axis of the contact angle of the roller

The invention claimed is:

1. A roller bearing assembly for determining loads on a roller bearing, the assembly comprising:
   a roller bearing with coaxial inner and outer rings and an axis of rotation, a plurality of rollers each having a rotation axis arranged between the inner ring and the outer ring, and each of the inner ring and the outer ring having at least one recess,
   a force-measuring pin received in each of the at least one recess, such that force-measuring pins are arranged in both of the rings, a longitudinal axis of the force-measuring pins arranged in each of the at least one recess extending at least partly along the axis of rotation of the roller bearing, and the at least one recess and the force-measuring pins extending along the longitudinal axis into a region of the ring, which is under a load, such that at least one vertical projection plane perpendicular to the rotation axis of the rollers extends along the force-measuring pins and a region of maximum load;

wherein the at least one recess includes a plurality of recesses and the roller bearing has a plurality of the force-measuring pins arranged in the plurality of recesses on at least one of the rings, and a length of one of the plurality of force-measuring pins along the longitudinal axis for one of the rings with higher rigidity being formed to be longer than a length of another one of the plurality of force-measuring pins for one of the rings with a lower rigidity.

2. The roller bearing assembly according to claim 1, wherein the at least one recess for receiving the force-measuring pins is arranged in one of the rings that is configured to be fixed in position.

3. The roller bearing assembly according to claim 1, wherein at least four of the force-measuring pins are arranged on at least one of the rings, such that two of the force-measuring pins are arranged to be opposite one another along a respective diagonal axis on the at least one ring.

4. The roller bearing assembly according to claim 3, wherein two of the force-measuring pins are arranged along the diagonal axis formed as a horizontal axis.

5. The roller bearing assembly according to claim 3, wherein the at least four force-measuring pins are arranged as two pairs of the force-measuring pins, each of the pairs of the force-measuring pins being opposite one another along a respective first and second diagonal axes, and the first and second diagonal axes extend such that one of the diagonal axes is a horizontal axis and another the diagonal axes is a vertical axis.

6. The roller bearing assembly according to claim 3, wherein two of the force-measuring pins are arranged along the diagonal axis formed as a vertical axis.

7. The roller bearing assembly according to claim 1, wherein the longitudinal axis of the force-measuring pins are angled with respect to the axis of rotation of the roller bearing.

8. The roller bearing assembly according to claim 7, wherein the longitudinal axis of the force-measuring pins are angled by 45 degrees to the axis of rotation of the roller bearing.

9. The roller bearing assembly according to claim 7, wherein there are a plurality of the force-measuring pins, and the longitudinal axes of the force-measuring pins are angled by 45 degrees to the axis of rotation of the roller bearing.

10. The roller bearing assembly according to claim 7, wherein the longitudinal axis of the force-measuring pins are angled to the axis of rotation of the roller bearing such that the longitudinal axis of the force-measuring pins are arranged parallel to the rotation axis of the rollers.

11. The roller bearing assembly according to claim 10, wherein there are a plurality of the force-measuring pins, and the longitudinal axes of the force-measuring pins are angled to the axis of rotation of the roller bearing such that the longitudinal axes of the force-measuring pins are arranged parallel to the rotation axis of the rollers.

12. The roller bearing assembly according to claim 1, wherein the longitudinal axis of the force-measuring pins are arranged parallel to the axis of rotation of the roller bearing.

13. The roller bearing assembly according to claim 1, wherein at least two of the force-measuring pins arranged in the recesses have different lengths along longitudinal axis thereof.

14. The roller bearing assembly according to claim 1, wherein at least two of the force-measuring pins arranged in the recesses are distributed circumferentially on a respective one of the rings.

15. A roller bearing assembly for determining loads on a roller bearing, the roller bearing assembly comprising:
a roller bearing with coaxial inner and outer rings and an axis of rotation, a plurality of rollers each having a rotation axis arranged between the inner ring and the outer ring, and at least one of the rings having a plurality of recesses;
a plurality of force-measuring pins received in the plurality of recesses, a longitudinal axis of the force measuring pins arranged in the plurality of recesses extending at least partly along the axis of rotation of the roller bearing, wherein at least two of the force-measuring pins arranged in the recesses have different lengths along the longitudinal axis thereof; and
the plurality of recesses and the plurality of force-measuring pins extending along the longitudinal axis into a region of the ring, which is adapted to be under a load, such that at least one vertical projection plane perpendicular to the rotation axis of the rollers extends along the force-measuring pins and a region of maximum load.

16. A roller bearing assembly for determining loads on a roller bearing, the assembly comprising:
a roller bearing with coaxial inner and outer rings and an axis of rotation, a plurality of rollers each having a rotation axis arranged between the inner ring and the outer ring, and at least one of the rings having at least two recess for receiving force-measuring pins;
a force-measuring pin received in each of the recesses, a longitudinal axis of each of the force-measuring pins arranged in the recesses extending at least partly along the axis of rotation of the roller bearing;
the recesses and the force-measuring pins extending along the longitudinal axis into a region of the ring, which is under a load, such that at least one vertical projection plane perpendicular to the rotation axis of the rollers extends along the force-measuring pin and a region of maximum load; and
the force-measuring pins arranged diametrically opposite to one another in the recesses and have different lengths along the longitudinal axis thereof.

\* \* \* \* \*